United States Patent
Nomani

(10) Patent No.: US 11,889,402 B2
(45) Date of Patent: Jan. 30, 2024

(54) SYSTEMS AND METHODS FOR DYNAMICALLY SWITCHING A PROXIMITY DETECTION POINT BETWEEN TWO DEVICES

(71) Applicant: Verizon Patent and Licensing Inc., Basking Ridge, NJ (US)

(72) Inventor: Muhammad Salman Nomani, Somerset, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 174 days.

(21) Appl. No.: 17/302,834

(22) Filed: May 13, 2021

(65) Prior Publication Data
US 2022/0369203 A1 Nov. 17, 2022

(51) Int. Cl.
*H04W 4/02* (2018.01)
*H04W 40/38* (2009.01)

(52) U.S. Cl.
CPC ........... *H04W 40/38* (2013.01); *H04W 4/023* (2013.01)

(58) Field of Classification Search
CPC .............................. H04W 40/38; H04W 4/023
See application file for complete search history.

(56) References Cited

U.S. PATENT DOCUMENTS

| | | | |
|---|---|---|---|
| 9,571,995 B1* | 2/2017 | Scheer | H04W 4/16 |
| 2004/0203554 A1* | 10/2004 | Simon | H04B 1/3877 |
| | | | 455/345 |
| 2009/0143053 A1* | 6/2009 | Levien | H04W 4/16 |
| | | | 455/41.2 |
| 2012/0096186 A1* | 4/2012 | Chang | H04W 76/14 |
| | | | 709/248 |
| 2013/0281023 A1* | 10/2013 | Madanarajagopal | H04B 7/00 |
| | | | 455/41.3 |
| 2014/0004839 A1* | 1/2014 | Block | H04M 3/42263 |
| | | | 379/212.01 |
| 2014/0274185 A1* | 9/2014 | Luna | H04L 65/1086 |
| | | | 455/517 |
| 2016/0316414 A1* | 10/2016 | Yeoum | H04M 3/58 |
| 2017/0126895 A1* | 5/2017 | Tevonian | H04M 3/54 |
| 2018/0317174 A1* | 11/2018 | Chaubey | H04W 52/0248 |

\* cited by examiner

*Primary Examiner* — Barry W Taylor

(57) ABSTRACT

A first device may dynamically switch a proximity detection point from a second device, conducting an on-going call via a device identifier, to the first device. The first device may receive a proximity detection signal or an indication of a loss of a proximity detection signal from the second device, wherein the first device and the second device are associated with the device identifier. The first device may receive, from a network, another indication of the on-going call being conducted by the second device and may provide, to the network, a call origination request to pull the on-going call based on the proximity detection signal or the indication and based on the other indication of the on-going call. The first device may connect with the on-going call based on the call origination request and may conduct the on-going call via the first device rather than the second device.

20 Claims, 8 Drawing Sheets

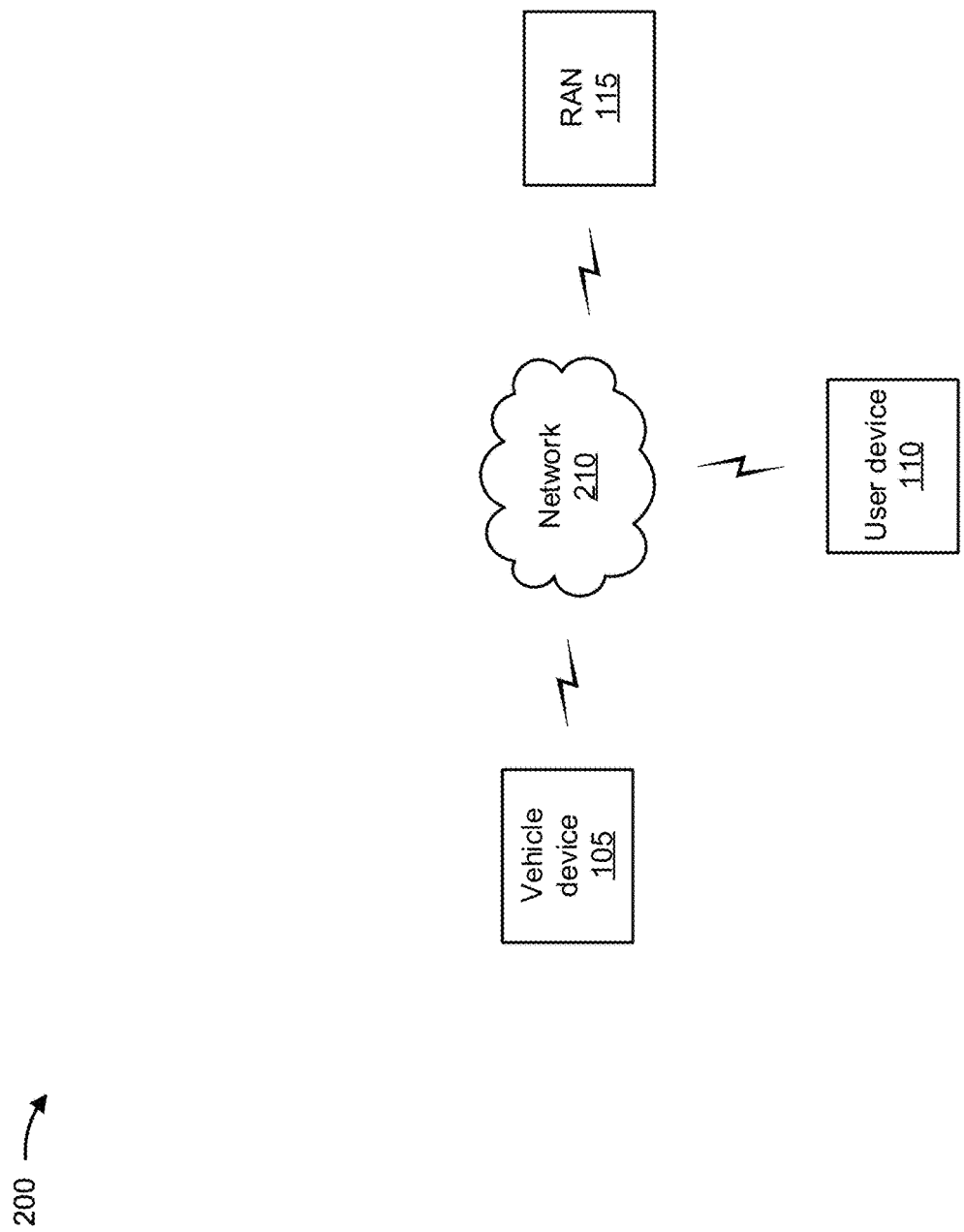

SYSTEMS AND METHODS FOR DYNAMICALLY SWITCHING A PROXIMITY DETECTION POINT BETWEEN TWO DEVICES

BACKGROUND

A user device (e.g., a smartphone) may pair with a vehicle device (e.g., an in-vehicle infotainment system) via Bluetooth pairing so that calls via the user device and/or media from the user device may be broadcast by the vehicle device. For example, Bluetooth may be activated on the user device and the vehicle device. Once the Bluetooth is activated, the vehicle device may appear as an "available device" in a Bluetooth menu of the user device. Selection of the vehicle device from the Bluetooth menu may cause the user device to pair with the vehicle device. However, the user device supports and manages the call in such an arrangement, rather than the vehicle device.

BRIEF DESCRIPTION OF THE DRAWINGS

FIG. 2 is a diagram of an example environment in which systems and/or methods described herein may be implemented.

DETAILED DESCRIPTION OF PREFERRED EMBODIMENTS

Figure 1A:
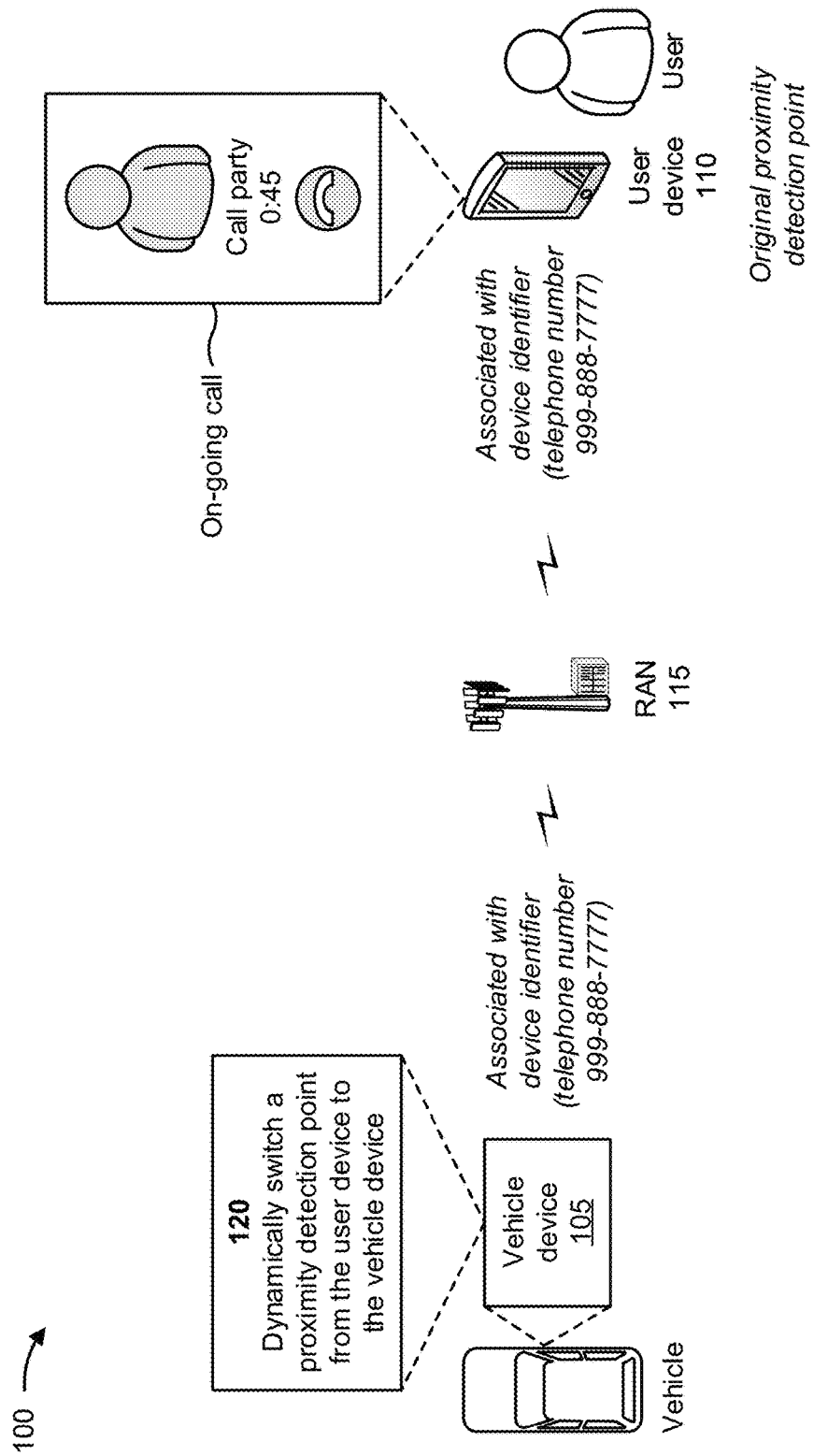
FIGS. 1A-1E are diagrams of an example associated with dynamically switching a proximity detection point associated with a vehicle device and a user device.

The following detailed description of example implementations refers to the accompanying drawings. The same reference numbers in different drawings may identify the same or similar elements.

A vehicle device and a user device may be paired automatically based on a proximity of the vehicle device and the user device (e.g., when the user device is within a range of a proximity detection (e.g., a Bluetooth) signal transmitted by the vehicle device). Typically, proximity may be detected by a device (e.g., the vehicle device or the user device) that receives the proximity detection signal sent by another device (e.g., the vehicle device or the user device) for proximity detection purposes. The other device does not detect the proximity and just transmits the proximity detection signal. Thus, either the vehicle device or the user device may detect proximity and the proximity detection functions of the vehicle device and the user device always remain fixed. However, such fixed proximity detection functions require the vehicle device and the user device to support two different types of call transfer techniques for transferring a call (e.g., a telephone call, a video call, a voice over Internet protocol (VoIP) call, and/or the like) from one device to another device.

Current call transfer techniques may include a call push transfer technique and a call pull transfer technique. The call push transfer technique is more complex, as compared to the call pull transfer technique, and includes complications, such as identifying and/or specifying to which shared identifier (e.g., a telephone number, a mobile device identifier, and/or the like) device a call is to be pushed (e.g., in case there are more than two shared identifier devices), properly displaying the pushed call to a user, properly displaying a call history associated with the pushed call, and/or the like. The call pull transfer technique may be simpler than the call push transfer technique. The call pull transfer technique provides details about a call to the pulling device before the pulling device pulls the call, so that once the call is pulled, the pulling device may correctly display the pulled call to a user and may properly display a call history associated with the pulled call.

Thus, current call transfer techniques and current proximity detection techniques waste computing resources (e.g., processing resources, memory resources, communication resources, and/or the like), networking resources, and other resources associated with being unable to properly push a call between a first device, such as a vehicle device, and a second device, such as a user device, requiring the first device or vehicle device and the second device or user device to support two different types of call transfer techniques.

Some implementations described herein provide a vehicle device and a user device that dynamically switch a proximity detection point associated with the vehicle device and the user device. For example, the vehicle device may dynamically switch a proximity detection point from the user device, conducting an on-going call via a device identifier (e.g., a telephone number, a mobile device identifier, and/or the like), to the vehicle device, and may receive a proximity detection signal from the user device. The vehicle device may receive, from a network, an indication of the on-going call being conducted by the user device and may provide, to the network, a call origination request to pull the on-going call based on receiving the proximity detection signal and based on the indication of the on-going call. The vehicle device may connect with the on-going call based on the call origination request and may conduct the on-going call via the vehicle device rather than the user device.

In this way, the vehicle device and the user device may dynamically switch a proximity detection point associated with the vehicle device and the user device. For example, the vehicle device and the user device may avoid complications associated with the call push transfer technique. The vehicle device and the user device may dynamically switch a proximity detection point between the vehicle device and the user device (e.g., depending upon a scenario) and thus may only utilize the call pull transfer technique. Thus, the vehicle device and the user device may conserve computing resources, networking resources, and other resources that would otherwise be consumed with being unable to properly push a call between the vehicle device and the user device, requiring the vehicle device and the user device to support two different types of call transfer techniques and/or the like.

FIGS. 1A-1E are diagrams of an example 100 associated with dynamically switching a proximity detection point associated with a first device (e.g., a vehicle device) and a second device (e.g., a user device). As shown in FIGS. 1A-1E, example 100 includes a vehicle, a vehicle device 105, a user device 110, and a radio access network (RAN) 115. The vehicle may include a car, a truck, a motorcycle, a bus, a boat, farm equipment, construction equipment, among other examples. In some examples, the vehicle may include an autonomous vehicle, a semiautonomous vehicle, or a non-autonomous vehicle. Further details of the vehicle device 105, the user device 110, and the RAN 115 are provided elsewhere herein.

As shown in FIG. 1A, the vehicle device 105 and the user device 110 may be associated with the same device identifier (e.g., telephone number 999-888-7777, a mobile device identifier, and/or the like). The vehicle device 105 and the user device 110 may utilize the device identifier and the RAN 115 to conduct a call or a communication (e.g., a telephone call, a video call, a voice over Internet protocol (VoIP) call, and/or the like) with a called party or a calling party. In some implementations, each of the vehicle device 105 and the user device 110 may be configured to be a proximity detection point (e.g., at different times or at the same time). As further shown, the user device 110 may be an original proximity detection point. The vehicle device 105 and user device 110 may dynamically switch between whether the vehicle device 105 is the proximity detection point or whether the user device 110 is the proximity detection point. For example, the vehicle device 105 may switch to become the proximity detection point when the user device 110 is conducting an on-going call to be pulled (e.g., transferred) to the vehicle device 105. Similarly, the user device 110 may switch to become the proximity detection point when the vehicle device 105 is conducting an on-going call to be pulled to the user device 110.

As further shown in FIG. 1A, a user of the user device 110 may be conducting an on-going communication (e.g., a telephone call, a video call, a VoIP call, and/or the like) with a call party (e.g., a called party or a calling party) as the user approaches the vehicle and the vehicle device 105. The vehicle may be powered on or powered off when the user approaches the vehicle. For example, the vehicle may be powered on via remote start function available for the vehicle. In another example, the vehicle may be powered off when the remote start function is not utilized or unavailable and the user has not utilized a key to power on the vehicle. The vehicle device 105 may be powered on or powered off when the user approaches the vehicle device 105. For example, the vehicle device 105 may always be powered on (e.g., via a battery) even when the vehicle is not actively being driven or occupied by a person, may be powered when the vehicle is powered on and provides power to the vehicle device 105, when the user remotely powers on the vehicle device 105, and/or the like. In another example, the vehicle device 105 may be powered off when the vehicle is not actively being driven or occupied by a person, when the user does not remotely power on the vehicle device 105, and/or the like.

As further shown in FIG. 1A, and by reference number 120, the vehicle device 105 may dynamically switch a proximity detection point from the user device 110 to the vehicle device 105. For example, the vehicle device 105 may switch to become the proximity detection point when the user device 110 is conducting the on-going call to be pulled (e.g., transferred) to the vehicle device 105.

Figure 1B:
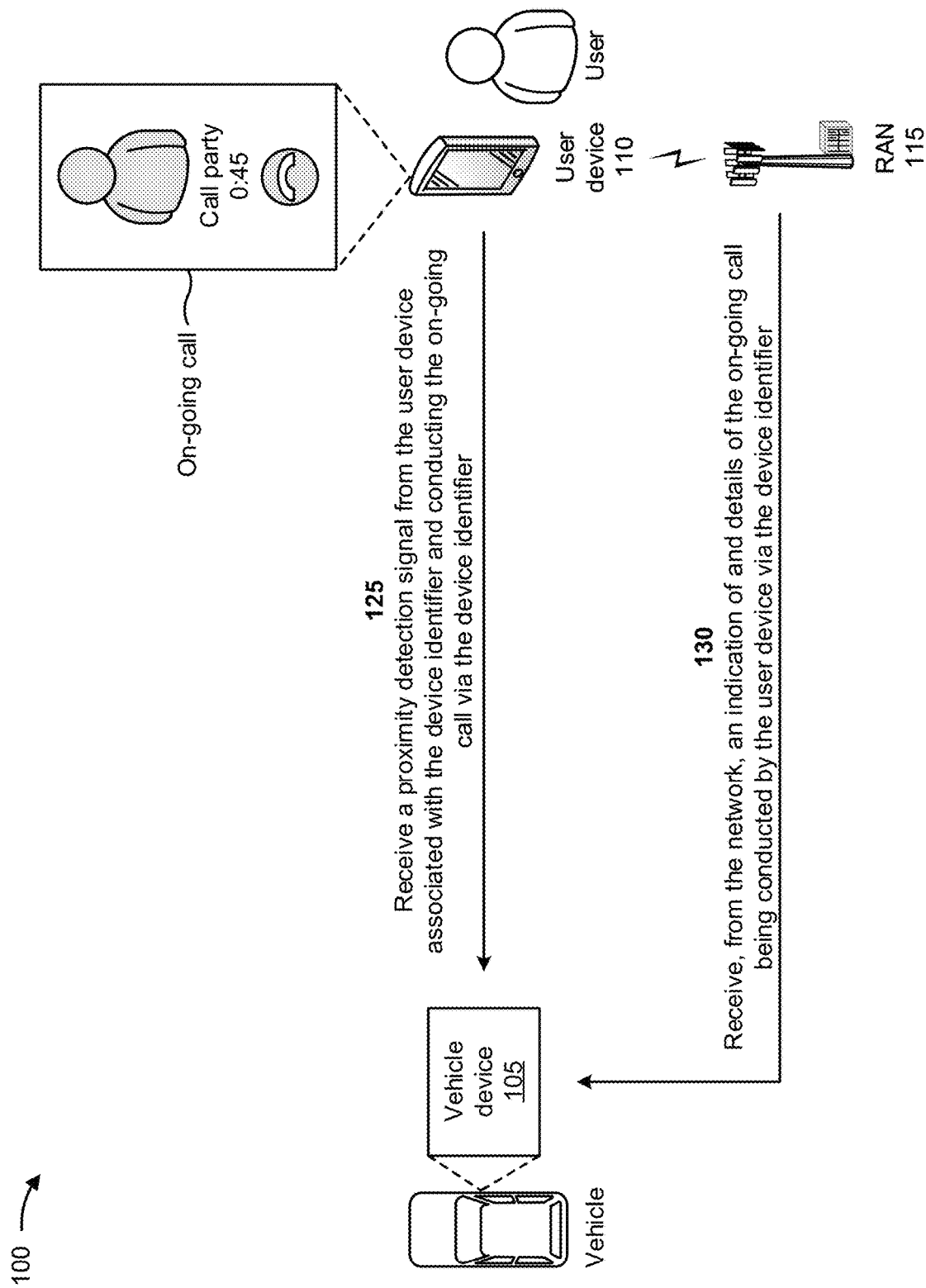

As shown in FIG. 1B, and by reference number 125, the vehicle device 105 may receive a proximity detection signal from the user device 110 associated with the device identifier and conducting the on-going call via the device identifier. In some implementations, the vehicle device 105 may receive the proximity detection signal when the vehicle device 105 is powered on and when the user device 110 is a predetermined distance from the vehicle device 105. The proximity detection signal may include a short-range wireless communication signal, such as a Bluetooth signal, a near-field communication (NFC) signal, a radio-frequency identification (RFID) signal, an infrared signal, a Wi-Fi signal, and/or the like. The predetermined distance may depend on the type of short-range wireless communication signal utilized for the proximity detection signal. In some implementations, the vehicle device 105 and the user device 110 may have preestablished a pairing relationship, prior to receipt of the proximity detection signal, so that the vehicle device 105 and the user device 110 may recognize each other. In some implementations, the vehicle device 105 may detect a proximity of the user device 110, relative to the vehicle device 105, based on a presence or a loss of the proximity detection signal, a strength of the proximity detection signal, an angle of arrival of the proximity detection signal, an angle of departure of the proximity detection signal, a time difference of arrival of the proximity detection signal, and/or the like.

As further shown in FIG. 1B, and by reference number 130, the vehicle device 105 may receive, from a network (e.g., the RAN 115), an indication of and details of the on-going call being conducted by the user device 110 via the device identifier. For example, since the vehicle device 105 may also be associated with the device identifier or other device identifiers, the vehicle device 105 may receive information associated with the device identifier (e.g., the on-going call being conducted by the user device 110 via the device identifier) even when the vehicle device 105 is not utilizing the device identifier to conduct a call. In some implementations, the indication of the on-going call may include a portion or all details associated the on-going call, such as a call history associated with the on-going call, an identity of a called party or a calling party associated with the on-going call, a quantity of time associated with the on-going call, and/or the like.

Figure 1C:
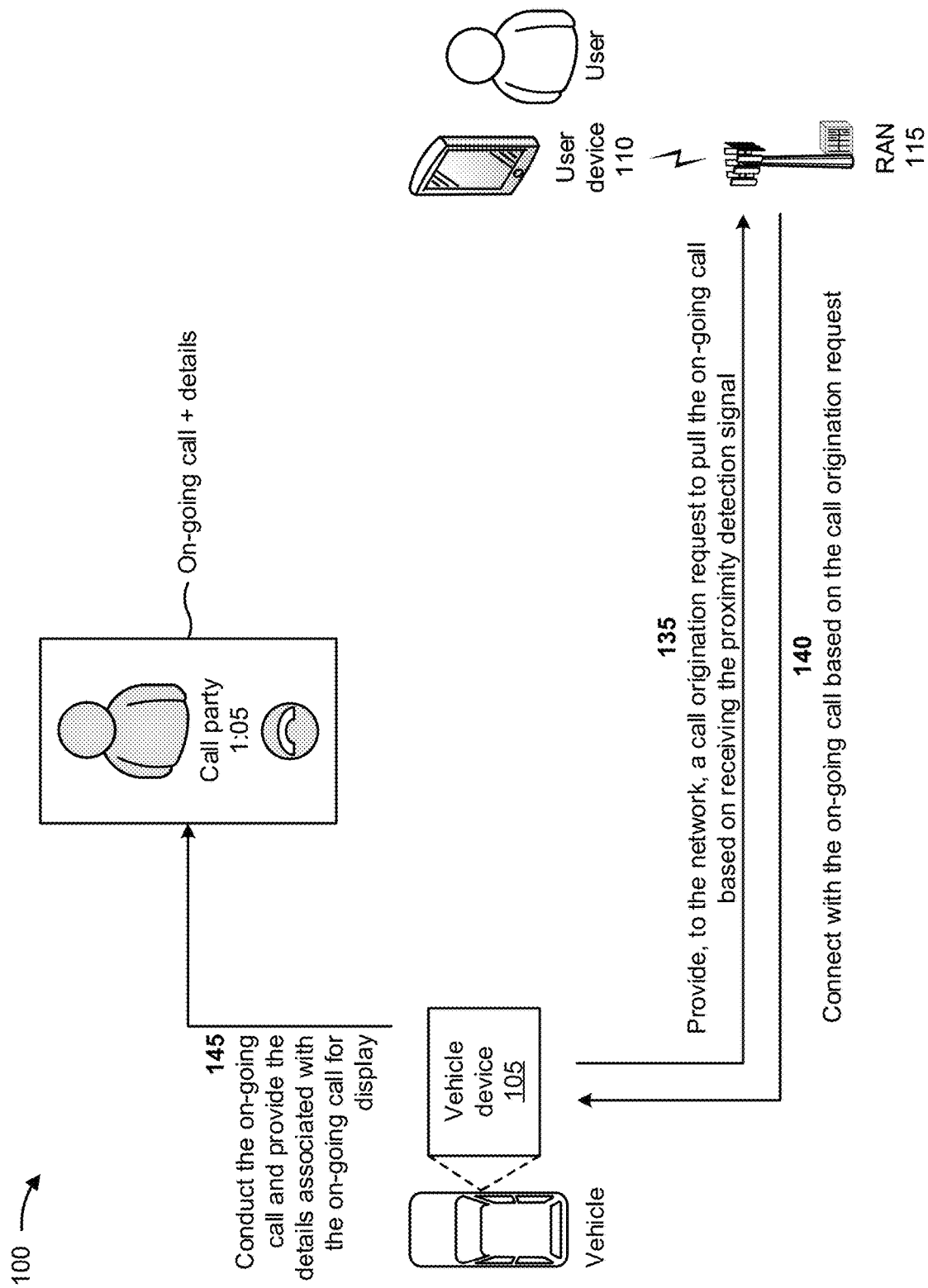

As shown in FIG. 1C, and by reference number 135, the vehicle device 105 may provide, to the network (e.g., the RAN 115), a call origination request to pull the on-going call based on receiving the proximity detection signal. For example, the vehicle device 105 may utilize the call pull transfer technique to generate the call origination request to pull the on-going call. The call pull transfer technique may provide some or all of the details associated with the on-going call, as described above, to the vehicle device 105 before the vehicle device 105 pulls the on-going call, so that once the on-going call is pulled, the vehicle device 105 may correctly display the on-going call to the user and may properly display the details associated with the on-going call.

As further shown in FIG. 1C, and by reference number 140, the vehicle device 105 may connect with the on-going call based on the call origination request. For example, the RAN 115 may transfer the on-going call from the user device 110 to the vehicle device 105 based on the call origination request.

As further shown in FIG. 1C, and by reference number 145, the vehicle device 105 may conduct the on-going call and may provide the details associated with the on-going call for display. For example, the vehicle device 105 may enable the user to conduct the on-going call via the vehicle device 105 rather than the user device 110. The vehicle device 105 may also display, to the user, the details associated with the on-going call, such as the call history associated with the on-going call, the identity of the called party or the calling party associated with the on-going call, the quantity of time associated with the on-going call, and/or the like.

In some implementations, if the vehicle device 105 is powered off during the on-going call or the user device 110 is greater than the predetermined distance from the vehicle device 105, the on-going call may be transferred back to the user device 110 so that the user device 110 may reconnect the on-going call. For example, the vehicle device 105 may be powered off when the vehicle is powered off, may be powered off a predetermined quantity of time after the vehicle is powered off, may be powered off based on an input from the user, and/or the like. The vehicle device 105 and the user device 110 may identify a loss of the proximity detection signal, when the vehicle device 105 is conducting the on-going call, based on the vehicle device 105 being powered off or based on the user device 110 being greater than the predetermined distance from the vehicle device 105. The user device 110 may utilize the call pull transfer technique to generate a call origination request to pull the on-going call and may receive the on-going call based on the call origination request. In some implementations, the user may wish to continue the on-going call with the user device 110 even when the vehicle device 105 is powered on and within the predetermined distance (e.g., based on the proximity detection signal satisfying a threshold strength) from the user device 110. In such implementations, the user may provide, to the vehicle device 105, an input instructing the vehicle device 105 to not pull the on-going call to the vehicle device 105.

Figure 1D:
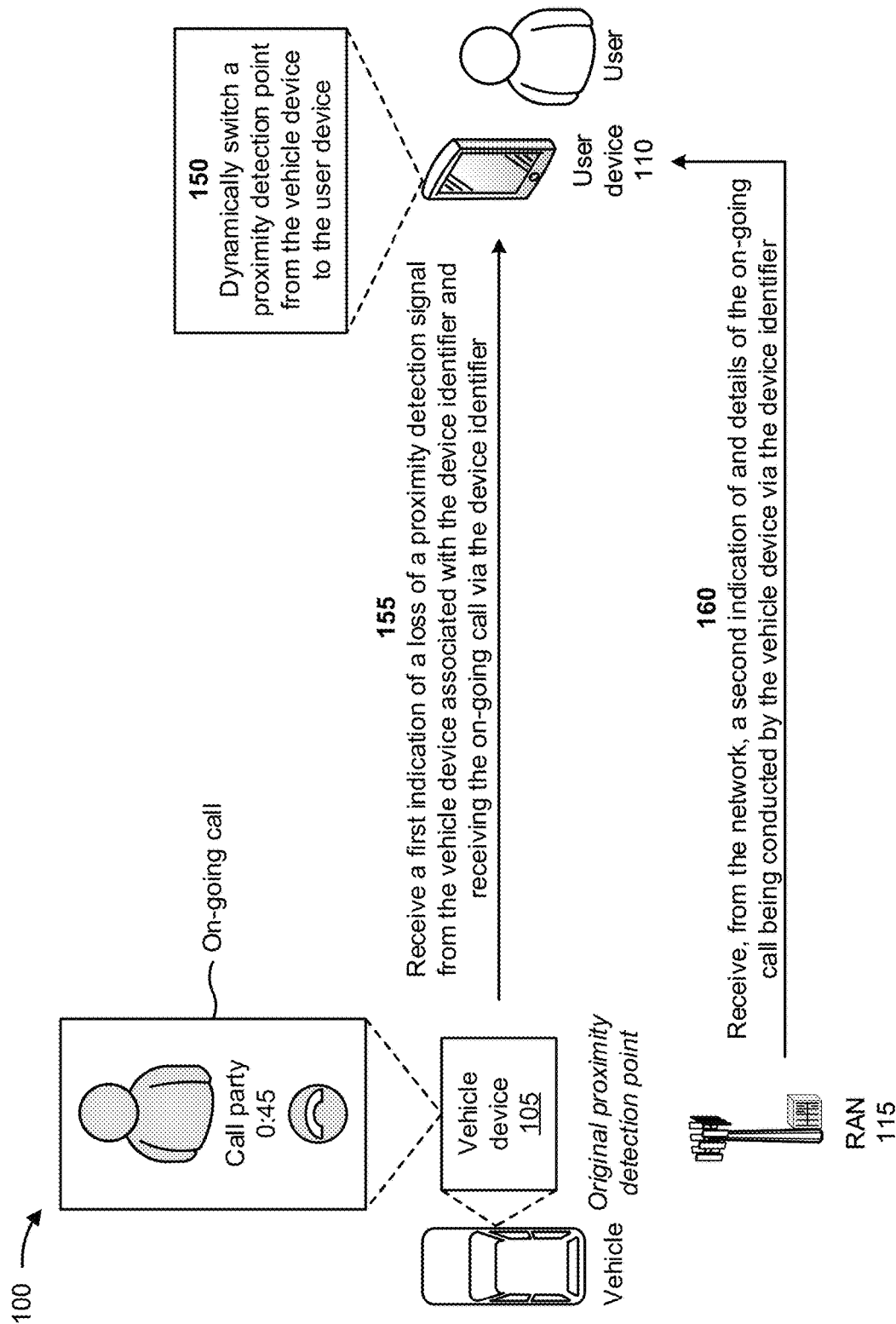

As shown in FIG. 1D, the user of the user device 110 may be conducting an on-going call with a call party (e.g., a called party or a calling party), via the vehicle device 105 and the device identifier, as the user moves away from the vehicle and the vehicle device 105 and/or as the vehicle device 105 is powered off. For example, the vehicle device 105 may be powered off when the vehicle is powered off, may be powered off by the user, and/or the like. As further shown, the vehicle device 105 may be an original proximity detection point.

As further shown in FIG. 1D, and by reference number 150, the user device 110 may dynamically switch a proximity detection point from the vehicle device 105 to the user device 110. For example, the user device 110 may switch to become the proximity detection point when the vehicle device 105 is conducting the on-going call to be pulled (e.g., transferred) to the user device 110.

As further shown in FIG. 1D, and by reference number 155, the user device 110 may receive a first indication of a loss of a proximity detection signal from the vehicle device 105 associated with the device identifier and receiving the on-going call via the device identifier or any type of identifier (e.g., a network address) used to facilitate communication with the vehicle device 105 and/or the user device 110. In some implementations, the user device 110 may receive the first indication of the loss of the proximity detection signal when the vehicle device 105 is powered off or when the user device 110 is greater than the predetermined distance from the vehicle device 105. In some implementations, the user device 110 may detect a proximity of the vehicle device 105, relative to the user device 110, based on a presence or a loss of the proximity detection signal, a strength of the proximity detection signal, an angle of arrival of the proximity detection signal, an angle of departure of the proximity detection signal, a time difference of arrival of the proximity detection signal, and/or the like.

As further shown in FIG. 1D, and by reference number 160, the user device 110 may receive, from a network (e.g., the RAN 115), a second indication of and details of the on-going call being conducted by the vehicle device 105 via the device identifier. For example, since the user device 110 may also be associated with the device identifier, the user device 110 may receive information associated with the device identifier (e.g., the on-going call being conducted by the vehicle device 105 via the device identifier) even when the user device 110 is not utilizing the device identifier to conduct a call. In some implementations, the second indication of the on-going call may include details associated the on-going call, such as a call history associated with the on-going call, an identity of a called party or a calling party associated with the on-going call, a quantity of time associated with the on-going call, and/or the like.

Figure 1E:
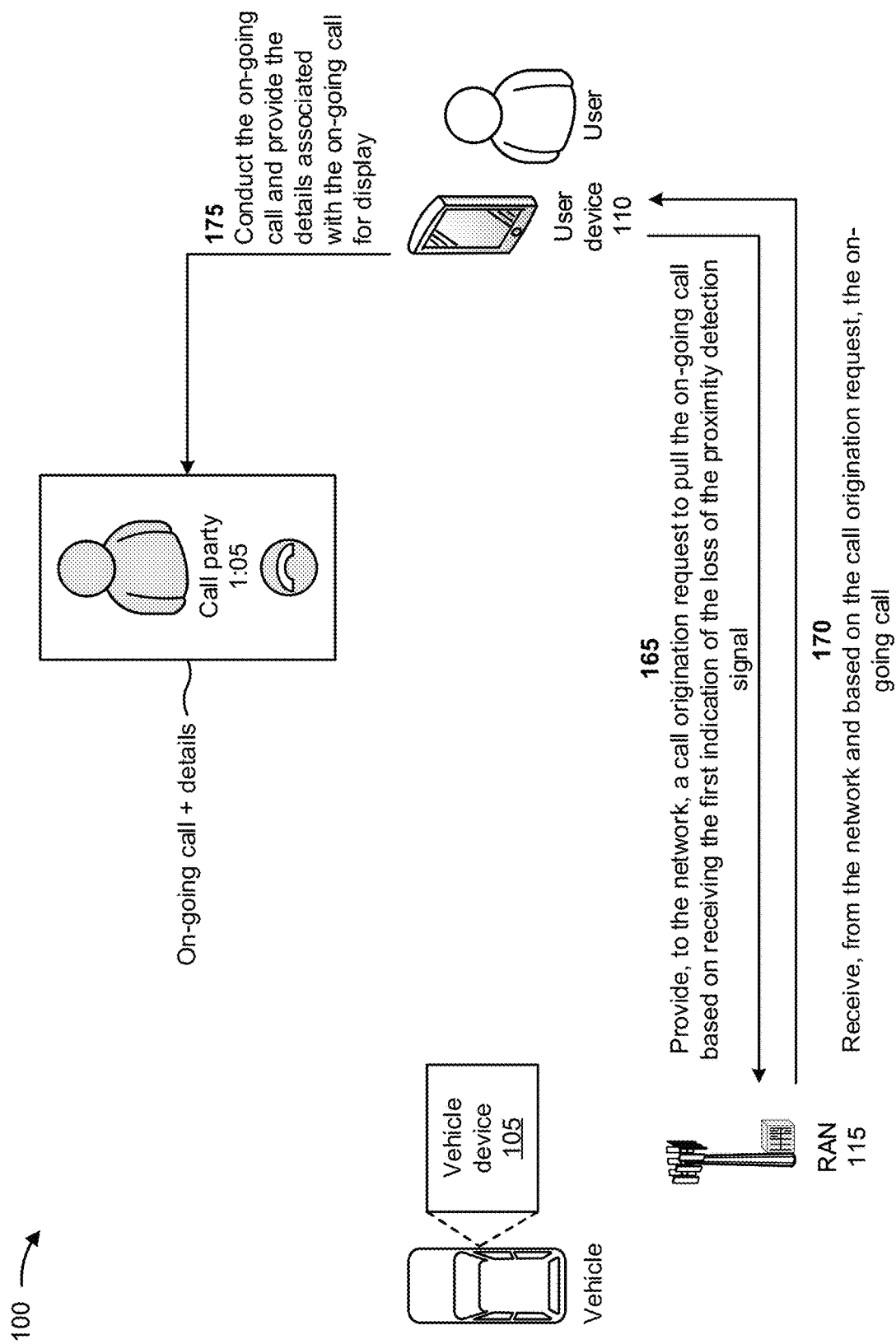

As shown in FIG. 1E, and by reference number 165, the user device 110 may provide, to the network (e.g., the RAN 115), a call origination request to pull the on-going call based on receiving the first indication of the loss of the proximity detection signal. For example, the user device 110 may utilize the call pull transfer technique to generate the call origination request to pull the on-going call. The call pull transfer technique may provide some or all of the details associated with the on-going call, as described above, to the user device 110 before the user device 110 pulls the on-going call, so that once the on-going call is pulled, the user device 110 may correctly display the on-going call to the user and may properly display the details associated with the on-going call.

As further shown in FIG. 1E, and by reference number 170, the user device 110 may connect with the on-going call based on the call origination request. For example, the RAN 115 may transfer the on-going call from the vehicle device 105 to the user device 110 based on the call origination.

As further shown in FIG. 1E, and by reference number 175, the user device 110 may conduct the on-going call and may provide the details associated with the on-going call for display. For example, the user device 110 may enable the user to conduct the on-going call via the user device 110 rather than the vehicle device 105. The user device 110 may also display, to the user, the details associated with the on-going call, such as the call history associated with the on-going call, the identity of the called party or the calling party associated with the on-going call, the quantity of time associated with the on-going call, and/or the like.

In some implementations, if the user device 110 is less than or equal to the predetermined distance from the vehicle device 105, the on-going call may be transferred back to the vehicle device 105 so that the vehicle device 105 may reconnect the on-going call. The vehicle device 105 and the user device 110 may identify the proximity detection signal, when the user device 110 is conducting the on-going call, based on the user device 110 being less than or equal to the predetermined distance from the vehicle device 105. The vehicle device 105 may utilize the call pull transfer technique to generate a call origination request to pull the on-going call and may receive the on-going call based on the call origination request. In some implementations, the user may wish to continue the on-going call with the vehicle device 105 even when the vehicle device 105 is greater than the predetermined distance from the user device 110. In such implementations, the user may provide, to the user device 110, an input instructing the user device 110 to not pull the on-going call to the user device 110.

In this way, the vehicle device 105 and the user device 110 may dynamically switch a proximity detection point associated with the vehicle device 105 and the user device 110. For example, the vehicle device 105 and the user device 110 may avoid the complications associated with the call push transfer technique. The vehicle device 105 and the user device 110 may dynamically switch a proximity detection point between the vehicle device 105 and the user device 110 (e.g., depending upon a scenario) and thus may only utilize the call pull transfer technique. Thus, the vehicle device 105 and the user device 110 may conserve computing resources, networking resources, and other resources that would otherwise be consumed with being unable to properly push a call between the vehicle device 105 and the user device 110, requiring the vehicle device 105 and the user device 110 to support two different types of call transfer techniques, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

FIG. 2 is a diagram of an example environment 200 in which systems and/or methods, described herein, may be implemented. As shown in FIG. 2, environment 200 may include the vehicle device 105, the user device 110, the RAN 115, and a network 210. Devices of environment 200 may interconnect via wired connections, wireless connections, or a combination of wired and wireless connections.

The vehicle device 105 includes devices capable of receiving, generating, storing, processing, and/or providing information, as described elsewhere herein. The vehicle device 105 may include a communication device and/or a computing device. For example, the vehicle device 105 may include a telematics device, a video camera, a dashboard camera, an inertial measurement unit, a three-axis accelerometer, a gyroscope, a global positioning system (GPS) device, an on-board diagnostics (OBD) device, a vehicle tracking unit, an electronic control unit (ECU), an in-vehicle infotainment system, among other examples.

The user device 110 includes one or more devices capable of communicating with other user devices 110, the RAN 115, and/or a network (e.g., the network 210). For example, the user device 110 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. The user device 110 may send traffic to and/or receive traffic from another user device 110 and/or the network 210 (e.g., via the RAN 115).

The RAN 115 may support, for example, a cellular radio access technology (RAT). The RAN 115 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, and/or similar types of devices) and other network entities that can support wireless communication for the vehicle device 105 and/or the user device 110. The RAN 115 may transfer traffic between the vehicle device 105 and/or the user device 110 (e.g., using a cellular RAT), one or more base stations (e.g., using a wireless interface or a backhaul interface, such as a wired backhaul interface), and/or the network 210.

In some implementations, the RAN 115 may perform scheduling and/or resource management for the vehicle device 105 and/or the user device 110 covered by the RAN 115 (e.g., the vehicle device 105 and/or the user device 110 covered by a cell provided by the RAN 115). In some implementations, the RAN 115 may be controlled or coordinated by a network controller, which may perform load balancing, network-level configuration, and/or other operations. The network controller may communicate with the RAN 115 via a wireless or wireline backhaul. In some implementations, the RAN 115 may include a network controller, a self-organizing network (SON) module or component, and/or a similar module or component. In other words, the RAN 115 may perform network control, scheduling, and/or network management functions (e.g., for uplink, downlink, and/or sidelink communications of the vehicle device 105 and/or the user device 110 covered by the RAN 115).

The network 210 includes one or more wired and/or wireless networks. For example, the network 210 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
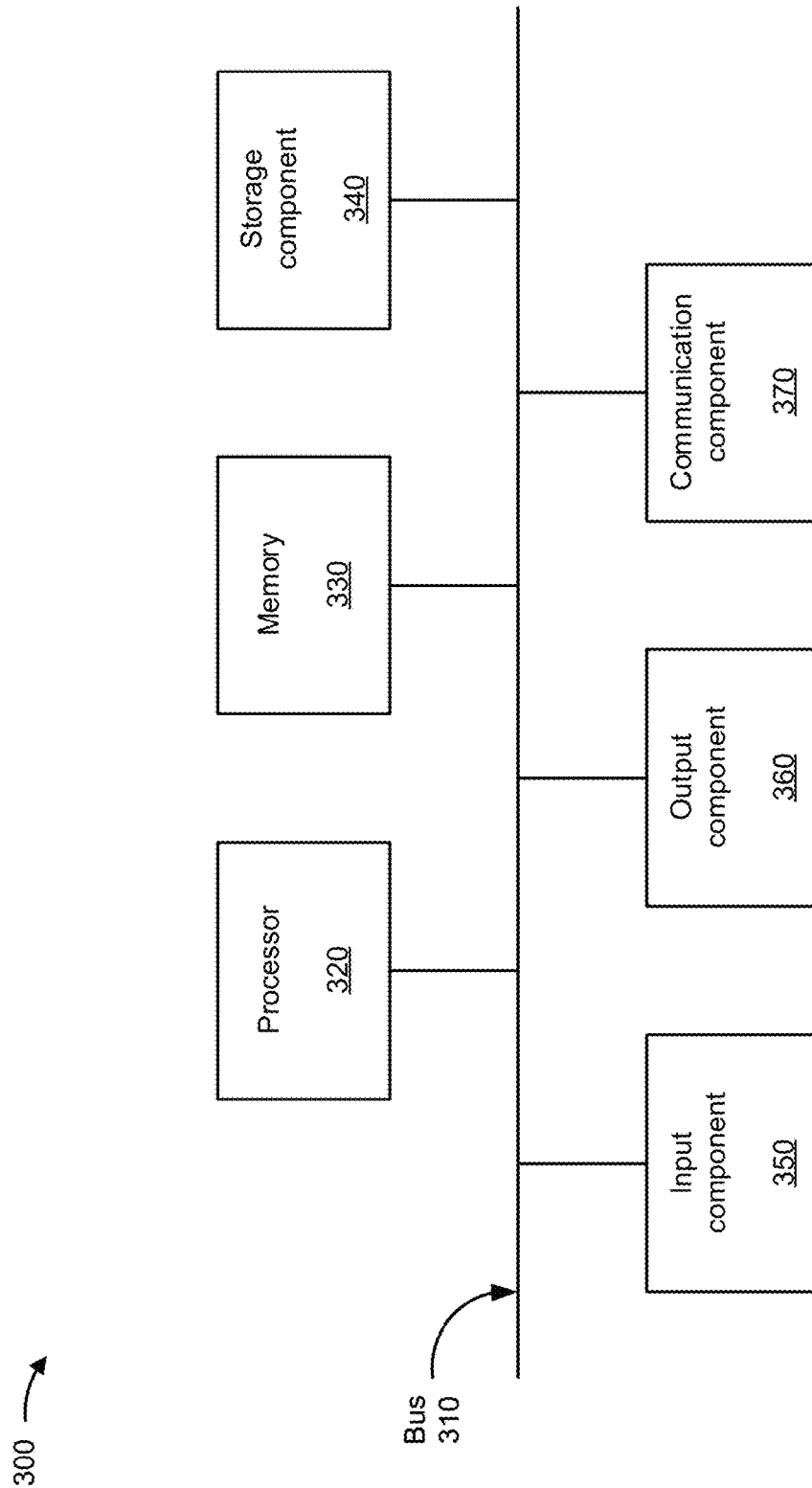
FIG. 3 is a diagram of example components of one or more devices of FIG. 2.

FIG. 3 is a diagram of example components of one or more devices of FIG. 2. The components may be components of a device 300, which may correspond to the vehicle device 105 and/or the user device 110. In some implementations, the vehicle device 105 and/or the user device 110 may include one or more devices 400 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random-access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
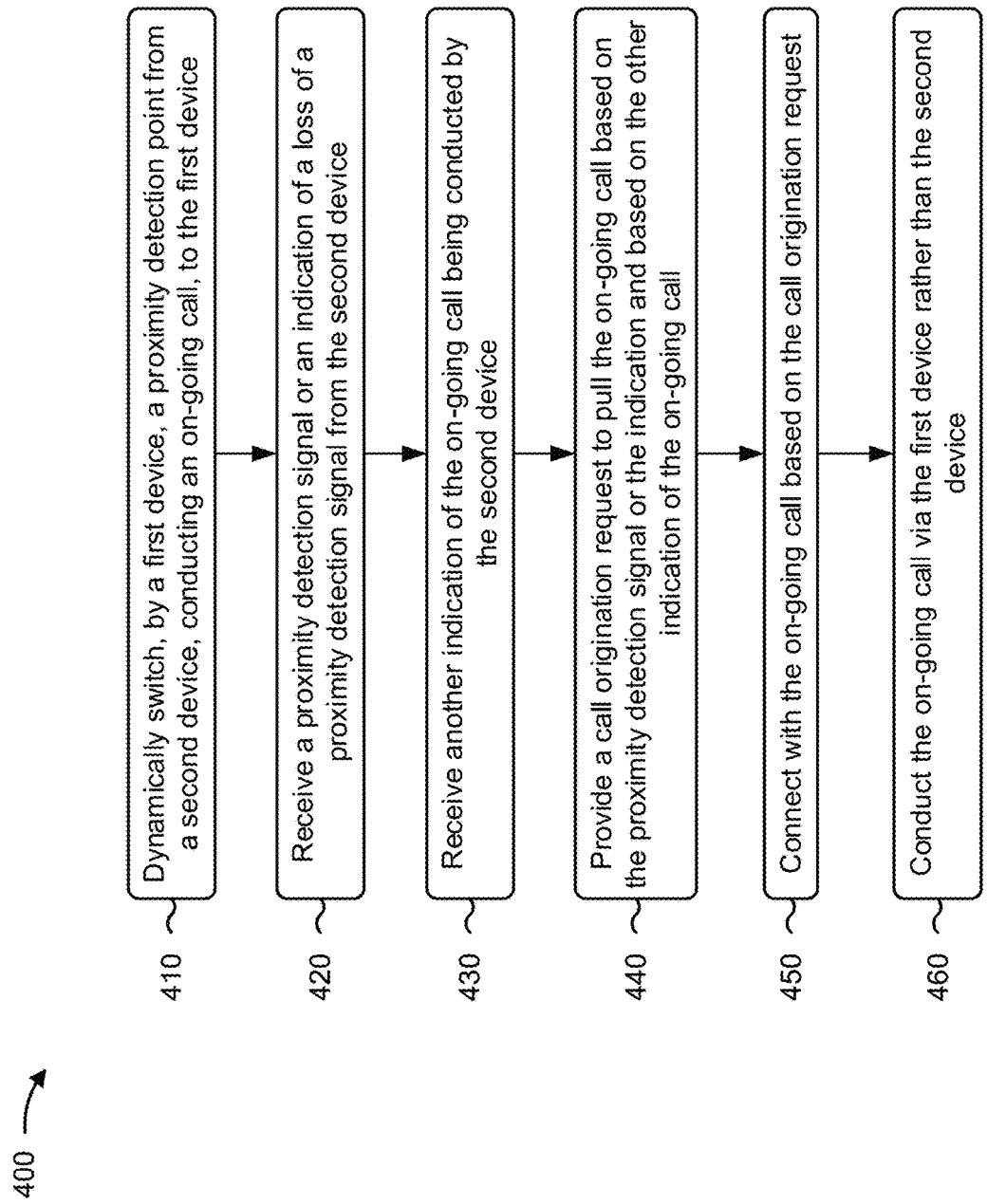
FIG. 4 is a flowchart of an example process associated with dynamically switching a proximity detection point associated with a vehicle device and a user device.

FIG. 4 is a flowchart of an example process 400 associated with dynamically switching a proximity detection point associated with the vehicle device 105 and the user device 110. In some implementations, one or more process blocks of FIG. 4 may be performed by a first device (e.g., the vehicle device 105). In some implementations, one or more process blocks of FIG. 4 may be performed by another device or a group of devices separate from or including the first device, such a second device (e.g., the user device 110). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include dynamically switching a proximity detection point from a second device, conducting an on-going call via a device identifier, to the first device (block 410). For example, the first device may dynamically switch a proximity detection point from a second device, conducting an on-going call via a device identifier, to the first device, as described above. In some implementations, the first device and the second device are associated with the device identifier.

As further shown in FIG. 4, process 400 may include receiving a proximity detection signal or an indication of a loss of a proximity detection signal from the second device (block 420). For example, the first device may receive a proximity detection signal or an indication of a loss of a proximity detection signal from the second device, as described above.

In some implementations, the first device is one of a user device or a vehicle device and the second device is another one of the user device or the vehicle device. In some implementations, the second device is associated with a vehicle and the first device receives the proximity detection signal or the indication of the loss of the proximity detection signal when the vehicle fails to provide power to the second device.

In some implementations, the proximity detection signal includes one or more of a Bluetooth signal, a near-field communication signal, a radio-frequency identification signal, an infrared signal, or a Wi-Fi signal. In some implementations, the first device is associated with a vehicle and receives the proximity detection signal from the second device when the vehicle provides power to the first device.

As further shown in FIG. 4, process 400 may include receiving, from a network, another indication of the on-going call being conducted by the second device (block 430). For example, the first device may receive, from a network, another indication of the on-going call being conducted by the second device, as described above.

As further shown in FIG. 4, process 400 may include providing, to the network, a call origination request to pull the on-going call based on the proximity detection signal or the indication of the loss of the proximity detection signal and based on the other indication of the on-going call (block 440). For example, the first device may provide, to the network, a call origination request to pull the on-going call based on the proximity detection signal or the indication of the loss of the proximity detection signal and based on the other indication of the on-going call, as described above.

As further shown in FIG. 4, process 400 may include connecting with the on-going call based on the call origination request (block 450). For example, the first device may connect with the on-going call based on the call origination request, as described above.

As further shown in FIG. 4, process 400 may include conducting the on-going call via the first device rather than the second device (block 460). For example, the first device may conduct the on-going call rather than the second device, as described above.

Process 400 may include additional implementations, such as any single implementation or any combination of implementations described below and/or in connection with one or more other processes described elsewhere herein.

In some implementations, process 400 includes detecting the proximity detection signal or the indication of the loss of the proximity detection signal when the first device is conducting the on-going call, wherein the second device reconnects with the on-going call based on the detection of the proximity detection signal. In some implementations, process 400 includes providing details associated with the on-going call for display. In some implementations, the details associated with the on-going call include one or more of a call history associated with the on-going call, an identity of a called party or a calling party associated with the on-going call, or a quantity of time associated with the on-going call. In some implementations, the other indication of the on-going call includes a portion of the details associated with the on-going call.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   dynamically switching, by a first device, a proximity detection point from a second device to the first device, the proximity detection point being a device that detects a proximity to another device based on receiving proximity detection signaling from the other device,
      wherein dynamically switching the proximity detection point is based on the second device conducting an on-going call to be pulled to the first device using a call pull transfer technique that provides call details to the first device before the first device pulls the on-going call;
   receiving, by the first device, a proximity detection signal from the second device in response to dynamically switching the proximity detection point to the first device;
   receiving, by the first device and from a network, an indication of the on-going call being conducted by the second device;
   providing, by the first device and to the network, a call origination request to pull the on-going call to the first device using the call pull transfer technique, the call origination request being based on receiving the proximity detection signal and based on the indication of the on-going call;
   connecting, by the first device, with the on-going call based on the call origination request;
   conducting the on-going call via the first device rather than the second device; and
   determining that the proximity detection signal fails to satisfy a signal strength threshold when the first device is conducting the on-going call,
      wherein the second device does not reconnect with the on-going call when the proximity detection signal fails to satisfy the signal strength threshold based on a user input instructing the second device to not pull the on-going call.

2. The method of claim 1, further comprising:
   providing details associated with the on-going call for display.

3. The method of claim 1, wherein the proximity detection signal includes one or more of:
   a Bluetooth signal,
   a near-field communication signal,
   a radio-frequency identification signal,
   an infrared signal, or
   a Wi-Fi signal.

4. The method of claim 1, wherein the first device is associated with a vehicle and receives the proximity detection signal from the second device when the vehicle provides power to the first device.

5. The method of claim 1, wherein the indication of the on-going call includes details associated with the on-going call and the details include one or more of:
   a call history associated with the on-going call, an identity of a called party or a calling party associated with the on-going call, or a quantity of time associated with the on-going call.

6. The method of claim 5, wherein the details include:
the call history associated with the on-going call,
the identity of the called party or the calling party associated with the on-going call, and
the quantity of time associated with the on-going call.

7. The method of claim 1, wherein the indication of the on-going call includes a portion of details associated with the on-going call.

8. A device, comprising:
one or more processors configured to:
dynamically switch a proximity detection point from another device to the device, the proximity detection point being a first device that detects a proximity to a second device based on receiving proximity detection signaling from the second device,
wherein dynamically switching the proximity detection point is based on the other device conducting an on-going call to be pulled to the device using a call pull transfer technique that provides call details to the device before the device pulls the on-going call;
receive a first indication of a loss of a proximity detection signal from the other device based on dynamically switching the proximity detection point to the device;
receive, from a network, a second indication of the on-going call being conducted by the other device based on the device and the other device being associated with a same device identifier;
provide, to the network, a call origination request to pull the on-going call to the first device using the call pull transfer technique, the call origination request being based on the first indication of the loss of the proximity detection signal and based on the second indication of the on-going call;
connect with the on-going call based on the call origination request;
conduct the on-going call via the device rather than the other device; and
determine that the proximity detection signal satisfies a signal strength threshold when the device is conducting the on-going call,
wherein the other device does not reconnect with the on-going call when the proximity detection signal satisfies the signal strength threshold based on a user input instructing the other device to not pull the on-going call.

9. The device of claim 8, wherein the one or more processors are further to:
provide details associated with the on-going call for display.

10. The device of claim 8, wherein the proximity detection signal includes one or more of:
a Bluetooth signal,
a near-field communication signal,
a radio-frequency identification signal,
an infrared signal, or
a Wi-Fi signal.

11. The device of claim 8, wherein the other device is associated with a vehicle and the device receives the first indication of the loss of the proximity detection signal when the vehicle fails to provide power to the other device.

12. The device of claim 8, wherein the second indication of the on-going call includes details associated with the on-going call and the details include one or more of:
a call history associated with the on-going call,
an identity of a called party or a calling party associated with the on-going call, or
a quantity of time associated with the on-going call.

13. The device of claim 12, wherein the details include:
the call history associated with the on-going call,
the identity of the called party or the calling party associated with the on-going call, and
the quantity of time associated with the on-going call.

14. The device of claim 8, wherein the second indication of the on-going call includes a portion of details associated with the on-going call.

15. A non-transitory computer-readable medium storing a set of instructions, the set of instructions comprising:
one or more instructions that, when executed by one or more processors of a first device, cause the first device to:
dynamically switch a proximity detection point from a second device to the first device, the proximity detection point being a device that detects a proximity to another device based on receiving proximity detection signaling from the other device,
wherein dynamically switching the proximity detection point is based on the second device conducting an on-going call to be pulled to the first device using a call pull transfer technique that provides call details to the first device before the first device pulls the on-going call;
receive a proximity detection signal or an indication of a loss of a proximity detection signal from the second device based on dynamically switching the proximity detection point to the first device;
receive, from a network, another indication of the on-going call being conducted by the second device based on the first device and the second device being associated with a same device identifier;
provide, to the network, a call origination request to pull the on-going call to the first device using the call pull transfer technique, the call origination request being based on the proximity detection signal or the indication of the loss of the proximity detection signal and based on the other indication of the on-going call;
connect with the on-going call based on the call origination request;
conduct the on-going call via the first device rather than the second device; and
detect the proximity detection signal or the indication of the loss of the proximity detection signal when the first device is conducting the on-going call,
wherein the second device does not reconnect with the on-going call, when detecting the proximity detection signal or when detecting the indication of the loss of the proximity detection signal, based on a user input instructing the second device to not pull the on-going call.

16. The non-transitory computer-readable medium of claim 15, wherein the first device is one of a user device or a vehicle device and the second device is another one of the user device or the vehicle device.

17. The non-transitory computer-readable medium of claim 15, wherein the second device is associated with a vehicle and the first device receives the proximity detection signal or the indication of the loss of the proximity detection signal when the vehicle fails to provide power to the second device.

18. The non-transitory computer-readable medium of claim 15, wherein the other indication of the on-going call includes details associated with the on-going call and the details include one or more of:
  a call history associated with the on-going call,
  an identity of a called party or a calling party associated with the on-going call, or
  a quantity of time associated with the on-going call.

19. The non-transitory computer-readable medium of claim 18, wherein the details include:
  the call history associated with the on-going call,
  the identity of the called party or the calling party associated with the on-going call, and
  the quantity of time associated with the on-going call.

20. The non-transitory computer-readable medium of claim 15, wherein the other indication of the on-going call includes a portion of details associated with the on-going call.

\* \* \* \* \*